United States Patent
Bahr et al.

(10) Patent No.: US 7,266,729 B2
(45) Date of Patent: Sep. 4, 2007

(54) MANAGING A WIRELESS PLATFORM

(75) Inventors: Casey Bahr, Hillsboro, OR (US); Patrick L. Reilly, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 10/330,654

(22) Filed: Dec. 27, 2002

(65) Prior Publication Data

US 2004/0128586 A1 Jul. 1, 2004

(51) Int. Cl.
*G06F 11/00* (2006.01)

(52) U.S. Cl. .............................. 714/41; 714/4

(58) Field of Classification Search ............. 379/27.01; 714/41

See application file for complete search history.

(56) References Cited

U.S. PATENT DOCUMENTS

| | | | | |
|---|---|---|---|---|
| 5,517,555 A | * | 5/1996 | Amadon et al. ............. | 455/408 |
| 5,706,333 A | * | 1/1998 | Grenning et al. ........... | 455/423 |
| 5,878,209 A | * | 3/1999 | Manssen ..................... | 714/57 |
| 5,991,643 A | * | 11/1999 | Chao-Cheng ............. | 455/575.7 |
| 6,181,994 B1 | * | 1/2001 | Colson et al. ................ | 701/33 |
| 6,654,910 B1 | * | 11/2003 | Eibach et al. ................. | 714/37 |
| 6,813,733 B1 | * | 11/2004 | Li et al. ........................ | 714/47 |
| 6,826,718 B1 | * | 11/2004 | Wu .............................. | 714/46 |
| 7,017,143 B1 | * | 3/2006 | Andrew et al. ............. | 717/100 |
| 7,024,187 B2 | * | 4/2006 | Moles et al. ................. | 455/423 |
| 7,181,648 B2 | * | 2/2007 | Bjorsne et al. ............... | 714/26 |
| 7,184,554 B2 | * | 2/2007 | Freese ......................... | 380/270 |
| 7,209,737 B2 | * | 4/2007 | Cho ........................... | 455/425 |
| 2001/0014615 A1 | * | 8/2001 | Dahm et al. ................ | 455/566 |
| 2001/0049263 A1 | * | 12/2001 | Zhang ........................ | 455/67.1 |
| 2003/0078844 A1 | * | 4/2003 | Takatori et al. ............... | 705/17 |

OTHER PUBLICATIONS

IEEE 100 The Authoritative Dictionary of IEEE Standards Terms, "Circular Queue", Dec. 2000, Standards Information Network IEEE Press, Seventh Edition, p. 170.*

IEEE 100 The Authoritative Dictionary of IEEE Standards Terms, "alarm condition", Dec. 2000, Standards Information Network IEEE Press, Seventh Edition, p. 24.*

Microsoft Press Computer Dictionary Third Edition, "dynamic-link library", Microsoft Press, 1997, p. 166.*

* cited by examiner

*Primary Examiner*—Gabriel Chu
(74) *Attorney, Agent, or Firm*—Trop, Pruner & Hu. P.C.

(57) ABSTRACT

In one embodiment of the present invention, a wireless platform may be managed by an operations, administration, and maintenance system which may include a configuration manager, a performance manager, an accounting manager, a fault manager, an event manager, and a notification manager.

13 Claims, 10 Drawing Sheets

MANAGING A WIRELESS PLATFORM

BACKGROUND

Embodiments of the present invention are generally directed to a wireless platform and more particularly to a system for management of wireless platform resources.

In terms of resources to be managed, handheld wireless devices such as cellular phones are typically viewed as an end point of a network. Commonly referred to as "terminal network elements," little or no management of these devices occurs. For instance, fault detection for such devices typically occurs when anomalies are detected in completing a call from the network side or when a customer complains. Furthermore, current analysis and repair operations are simply to retrieve the entire unit and replace it.

In contrast, in the personal computer ("PC") environment, the "terminal elements" are highly sophisticated, complex devices (servers, desktop PCs, laptops, and the like). In the PC environment, a rich platform management model and implementation has evolved to better serve both administrators and end users.

These two environments, the wireless and PC worlds, are merging within new devices that offer both cellular communications and rich compute-intensive applications. As computational and communication abilities merge in more sophisticated and expensive wireless devices, the fetch-and-replace method of fault management becomes more undesirable. Thus the ability to locally and remotely manage such devices and particularly to manage faults is needed.

DETAILED DESCRIPTION

In one embodiment, the present invention includes an Operations, Administration, and Maintenance (OA&M) system for wireless platforms (i.e., devices), and more particularly for wireless handheld devices, such as personal digital assistants (PDA's), advanced cellular phones (e.g., phones providing Internet access and computing capabilities) and the like. Such an OA&M system may support platform performance monitoring, control, analysis, and quality assurance.

In one embodiment, the operations portion of the system may include activities that provide services to an end user and the associated functions required to support those services, such as provisioning (of resources and services), performance management, account management, billing, and the like. In this embodiment, the administration portion of the system may manage components that deliver required levels of service, and thus may include concepts such as Quality of Service (QoS), performance management, and traffic management. Further in this embodiment, maintenance may include corrective maintenance and preventive maintenance. Corrective maintenance may include failure detection and recovery, while preventive maintenance may include the tracking and alerting of pending or possible fault conditions and the reconfiguration of platform resources. In certain embodiments, maintenance may apply to both hardware and software resources.

In one embodiment, an OA&M system for wireless devices may encompass a layered system approach to the management of platform resources (e.g., devices, device or network components, peripherals, software, and the like) that can in some way be "managed." That is, the resources may be configurable as to various states and behaviors.

Figure 1A:
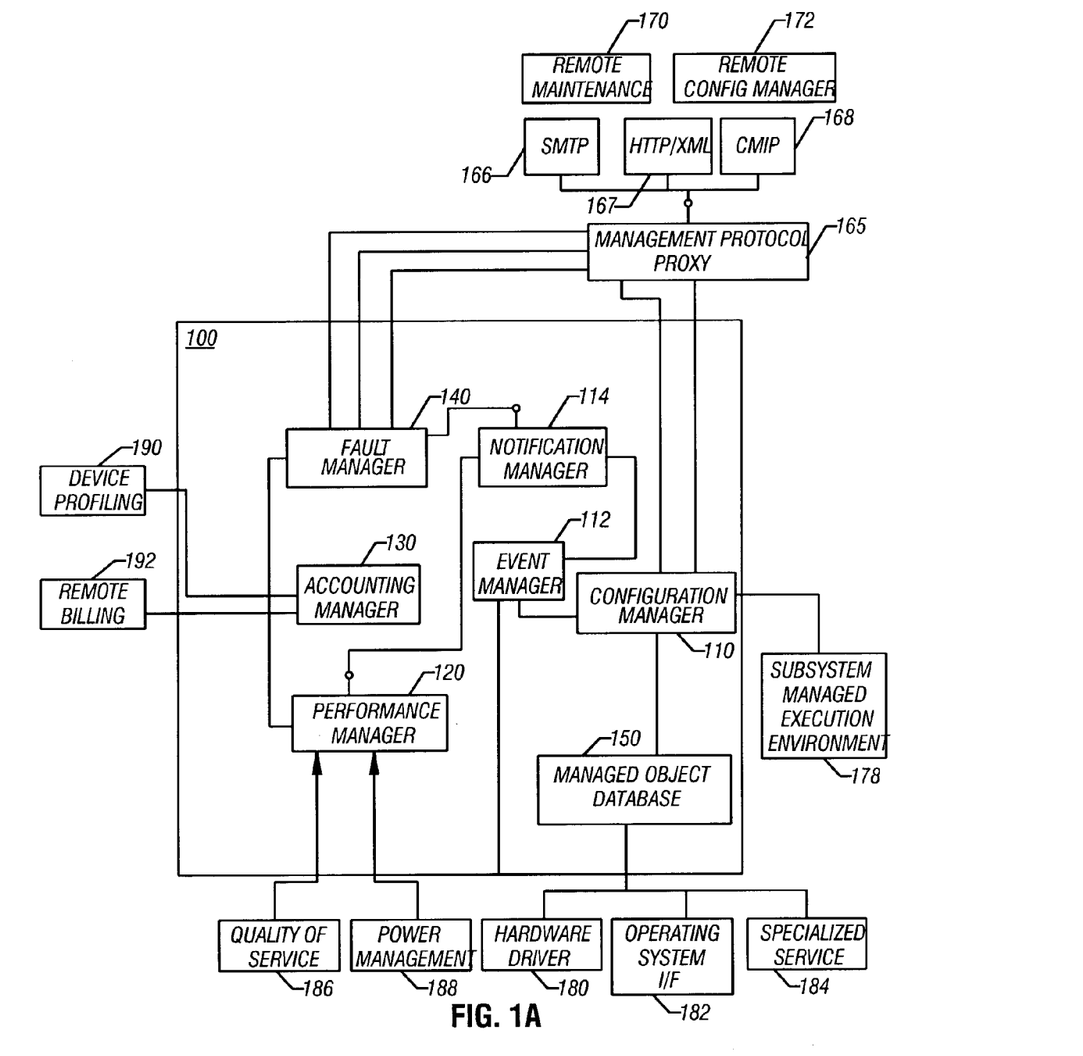
FIG. 1A is a block diagram of a system in accordance with one embodiment of the present invention.

Referring now to FIG. 1A, shown is a block diagram of an OA&M system in accordance with one embodiment of the present invention, and its relation within a wireless network. As shown in FIG. 1A, OA&M system 100 includes a configuration manager 110, a performance manager 120, an accounting manager 130, a fault manager 140, an event manager 112 and a notification manager 114. Each of these so-called "managers" may include software code including one or more objects to perform the desired functions. In some embodiments, system 100 may be resident on a wireless device itself, while in other embodiments at least portions of system 100 may be resident at a network location.

Further shown in FIG. 1A is a managed object database 150 which may contain files corresponding to each of the managed objects ("MO") of system 100. The managed objects model or represent the platform resources managed by system 100. In certain embodiments, these managed objects may include objects related to various hardware and software components (or portions thereof) including, for example, a processor, memory, other semiconductor devices, an operating program, a communications program, and other software components.

Also shown in FIG. 1A are examples of interfaces between system 100 and other hardware and software. In various embodiments, certain ones of these components may be implemented within the wireless device, while others may be remote. In one embodiment these components may include one or more management protocol proxy(s) 165 that permit communication with remote sites. In the embodiment of FIG. 1A, these remote sites may include, for example, a remote maintenance site 170 and a remote configuration manager 172. In different embodiments, such communication may occur via various protocols, for example Simple Mail Transfer Protocol (SMTP) 166, Hypertext Transfer Protocol/Extensible Markup Language (HTTP/XML) 167, or Common Management Information Protocol (CMIP) 168. Further, communications from system 100 may be displayed locally on a wireless device via a local browser (not shown in FIG. 1A).

Also shown in FIG. 1A is a subsystem managed execution environment (MEE) 178, such as a virtual machine, to which download operations may occur from system 100.

Further shown in FIG. 1A are examples of devices to be modeled as the managed objects in one embodiment. As shown in FIG. 1A, these devices may include a hardware driver 180, an operating system interface 182, and a specialized service 184. In one embodiment, specialized service 184 may be a communication service, for example.

FIG. 1A also shows interfaces that may be coupled to accounting manager 130. In the embodiment of FIG. 1A, accounting manager 130 may communicate with a remote billing function 192. In such manner, session detail records, which record information pertaining to billing that may occur when the wireless device is both online and offline, may be provided to remote billing function 192. Further, accounting manager 130 may communicate with a device profiling function 190 in which profile information regarding the device may be provided to or from system 100. Such information, in one embodiment, may include identification of device capabilities, such as display and communication characteristics and the like.

In configuration manager 110, configuration data corresponding to the platform may be defined and maintained. This data may be static or dynamic in different embodiments. Various operations on the configuration data may be performed by configuration manager 110, such as adding data to create new resources, deleting data to remove unused resources, and modifying data relating to existing resources, for resource optimization and the like. In certain embodiments, configuration data may be used by asset/inventory management, network management, content or application delivery and provisioning applications, among others.

The configuration manager 110 may handle the configuration of managed objects through various operations. In one embodiment, configuration manager 110 may perform the following generalized operations: creation, in which a managed object is created; initialization, in which the managed object is initialized into a known operational state; deletion, in which a managed object is removed; modification, in which one or more attributes of a managed object are modified; and query, in which the status or data of the managed object is queried. In one embodiment, configuration manager 110 may include a core MO manager which controls operations for configuration manager 110. Further, in such an embodiment configuration manager 110 may include one or more MO agents which may be responsible for interfacing with various components, such as applications, middleware, hardware controllers and the like. In one embodiment, each MO agent may interface with a single resource or set of closely related resources, such as applications from a single vendor or a particular hardware controller, for example.

Figure 1B:
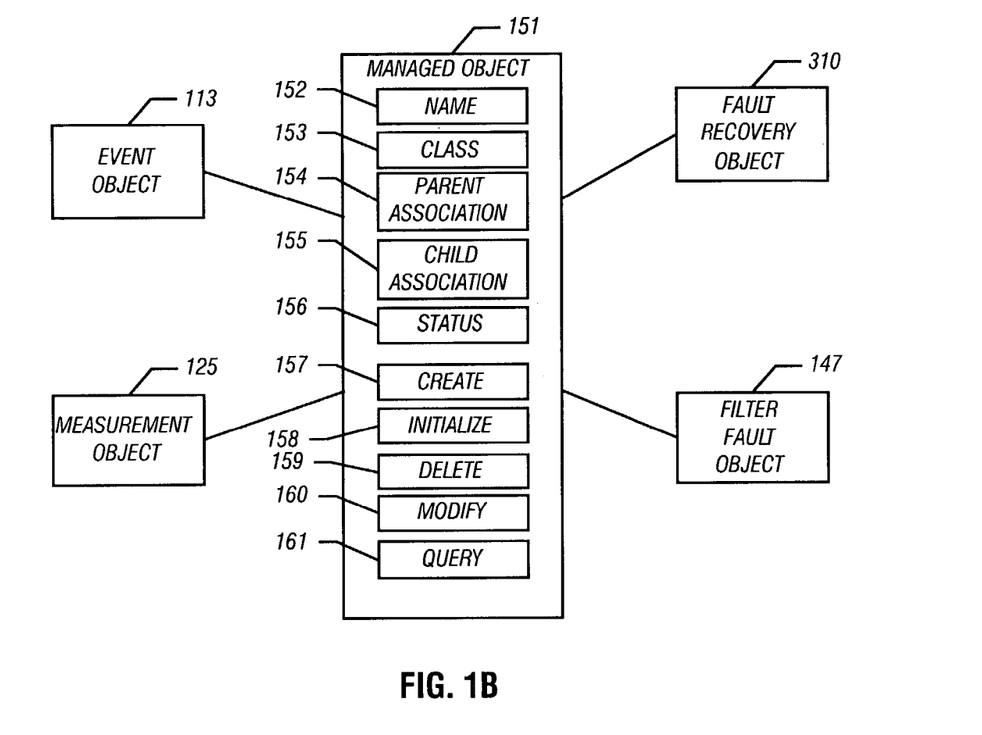
FIG. 1B is a block diagram of a managed object and its relation to other objects in accordance with one embodiment of the present invention.

Referring now to FIG. 1B, shown is a block diagram of a managed object in accordance with one embodiment of the present invention. As shown in FIG. 1B, managed object 151 includes name attribute 152, class attribute 153, parent and child associations (attributes 154 and 155, respectively), and status attribute 156. Because multiple managed objects may represent a single resource, the parent and child association attributes may be used as pointers to indicate relationships and dependencies between managed objects. Managed object 151 may also include the following methods: create; initialize; delete; modify; and query (respectively methods 157-161). These methods may be performed in accordance with the above discussion of the operation of configuration manager 110 in one embodiment.

FIG. 1B also shows the relationship between managed object 151 and other objects. In the embodiment shown in FIG. 1B, these objects include event object 113 of event manager 112, measurement object 125 (which may be related to performance manager 120), fault recovery object 310 and filter fault object 147, both discussed below in connection with fault manager 140.

Figure 2:
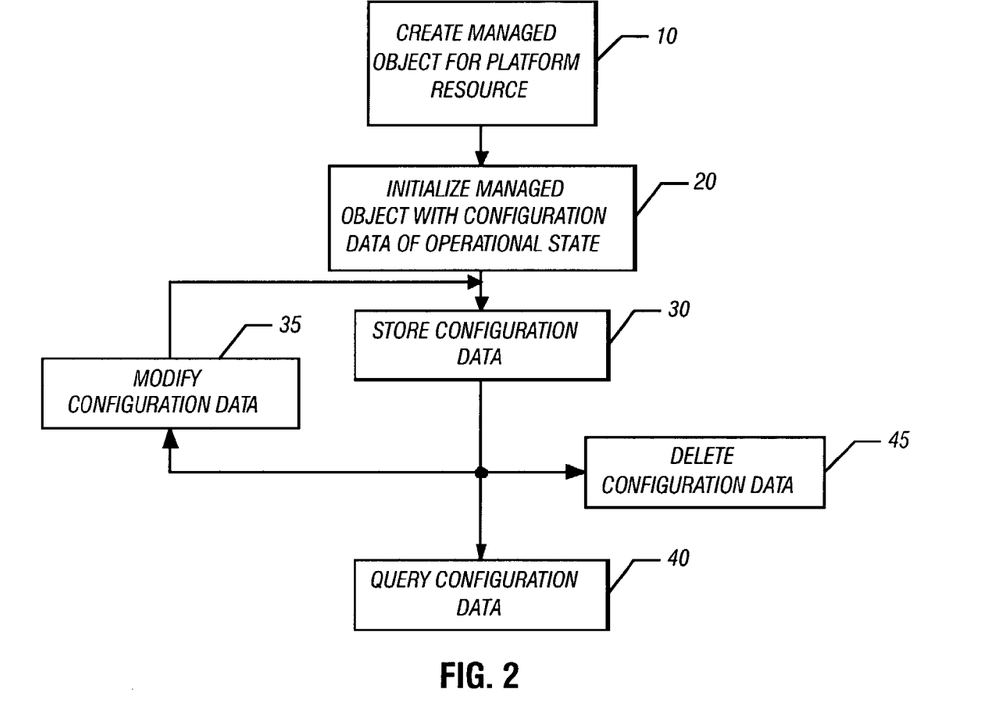
FIG. 2 is a flow chart of an example program flow for a configuration manager in accordance with one embodiment of the present invention.

Referring now to FIG. 2, shown is a flow chart of an example program flow for a configuration manager in accordance with one embodiment of the present invention. As shown in FIG. 2, the configuration manager may create a managed object for a platform resource (block 10). Then, the managed object may be initialized with configuration data relating to the operational state of the modeled platform resource (block 20). This configuration data may be stored (block 30), for example, in database 150. During operation, when information regarding the managed object is desired within or outside of system 100, the configuration data may be queried (block 40) to provide the information desired. In certain embodiments, at least certain of the data may be modified (block 35) or deleted (block 45).

In one embodiment, event manager 112 may provide a model for the capture and delivery of platform events, such as any instantaneous change in a managed object. These events may be the foundation upon which platform monitoring, performance tuning, fault management, power management, and configuration are built. Each MO may define at least one event object 113 to monitor state or attribute change within that MO, as shown in FIG. 1B. Additional events may be defined by the MO for behaviors or characteristics specific to that MO. For instance, a MO may issue an event based on an internal timer or counter, which causes an event to be issued to a monitor object responsible for adjusting the performance of a platform resource represented by the MO.

In one embodiment, a notification manager 114 may be used to package and deliver event details to interested system components. Such information may include, for example, the MO generating the event, its class and instantiation, the time of the event, and optional information related to the particular MO, its function, and relationships to other MO's in the platform, if applicable. In certain embodiments, other components within the platform may receive notifications via subscriptions.

In one embodiment, system 100 may also include a performance manager 120. Performance manager 120 may define functionality for end-user and business-level usage designed to achieve the highest levels of local and network performance, physical and logical configurations, preventative maintenance, avoidance of service outages, as well as measures of quality delivery from service providers and client applications operation. In certain embodiments, performance manager 120 may be used by external entities, including on-platform management applications or remote monitoring or maintenance applications to enhance or optimize overall platform or subsystem performance-related characteristics. In certain embodiments, performance manager 120 may specialize alarm notifications and filtering for its monitoring, control, and analysis functions.

As an example, a wireless device with the ability to connect to different networks (e.g., cellular, wireless local area networks (WLAN) based on the IEEE 802.11b standard, IEEE std. 802.11b-1999 (published Sep. 16, 1999), BLUETOOTH in accordance with the Core Specification of the Bluetooth System (published Feb. 22, 2001), and the like) may have primary connectivity provided by one or more service providers. Performance manager 120 may be used to monitor bandwidth (preferred and actual), to both client applications and network accounting applications.

In the context of a managed device, performance manager 120 may perform the following functions in one embodiment: measurement administration, in which the lifecycle of performance measurement activities may be governed to provide a configuration interface and allow for retrieval of performance management results; monitoring, in which performance-related data is accumulated and managed, along with its storage and availability to off- and on-platform managers (e.g., operations applications residing with the management network); and analysis, in which monitoring data is used to characterize the performance of managed platform resources, detect threshold crossings, and adjust parameters to enhance on-platform performance. In one embodiment, this data may relate to quality of service (QoS) (box 186) and power management (box 188).

Accounting manager 130 may provide local platform data, which allows a service provider to reliably store and access local billing information and allows a subscriber to view current account state. Shown in FIG. 3 is a block diagram of an object model for an accounting manager in accordance with one embodiment of the present invention.

Figure 3:
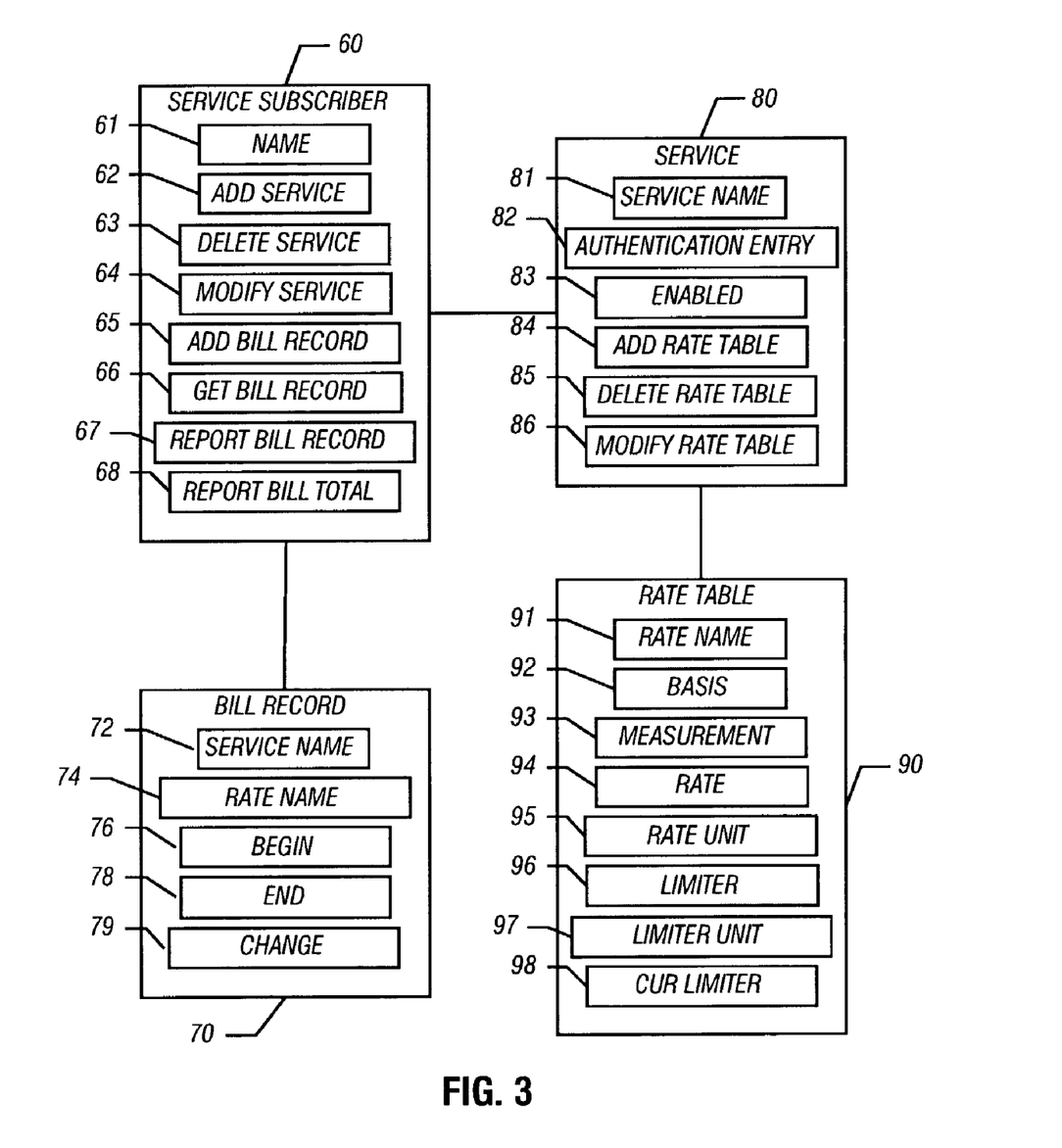
FIG. 3 is a block diagram of an object model for an accounting manager in accordance with one embodiment of the present invention.

As shown in FIG. 3, accounting manager 130 may include a service subscriber object 60, a bill record object 70, a service object 80 and a rate table object 90. Each of these objects may include various attributes and methods. As shown in the embodiment of FIG. 3, service subscriber object 60 may include a name attribute 61 and the following methods: add service; delete service; modify service; add bill record; get bill record; report bill record; and report bill total (respectively, methods 62-68). Bill record object 70 may include the following attributes: service name; rate name; begin; end; and charge (respectively, attributes 72, 74, 76, 78 and 79). Service object 80 may include a service name attribute 81, an authentication entry attribute 82, and an enabled attribute 83, and also may include an add rate table method 84, a delete rate table method 85, and a modify rate table method 86. Rate table object 90 may include the following attributes: rate name; basis; measurement; rate; rate unit; limiter; limiter unit; and cur limiter (respectively, attributes 91-98).

In one embodiment, system 100 may also include a fault manager 140. In certain embodiments, fault manager 140 may perform one or more of: (1) detection of alarms and faults as they occur and notification to other components, subsystems, or human operators immediately upon receipt; (2) isolation of faults to the smallest functional unit possible and subsequent limitation of the fault's effects; (3) determination of fault cause, which may include the use of test routines, diagnosis and correlation techniques; and (4) repair or elimination of failures using maintenance routines (or human intervention).

Figure 4A:
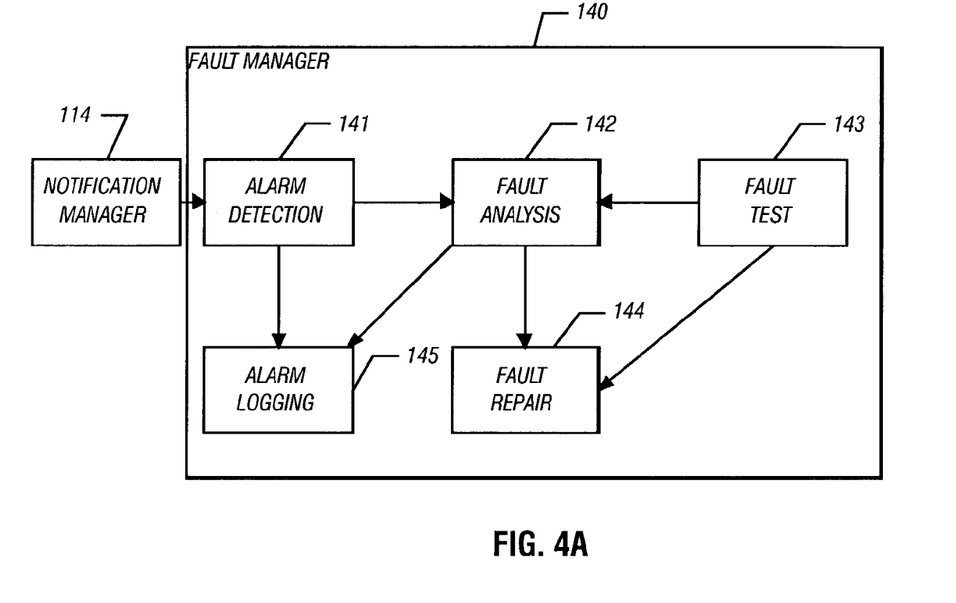
FIG. 4A is a block diagram of a fault manager component in accordance with one embodiment of the present invention.

Referring now to FIG. 4A, shown is a block diagram of the components of fault manager 140 in accordance with one embodiment of the present invention. As shown in FIG. 4A, in this embodiment fault manager 140 includes an alarm detection component 141, a fault analysis component 142, a fault test component 143, a fault repair component 144, and an alarm logging component 145.

In this embodiment, alarm detection component 141 may be a collection point for notifications of abnormal, anomalous, or out-of-tolerance behavior within the MO's that it receives from notification manager 114. Fault analysis component 142 may analyze notifications received by alarm detection component 141 for fault characteristics. Notifications may then be escalated to the status of a true fault based on intrinsic alarm record data and/or subsequent fault tests.

Fault analysis component 142 may use fault test component 143 to determine if an alarm is indeed a fault when the attributes of an alarm record obtained from the alarm detection component 141 are insufficient to determine. In one embodiment, fault analysis component 142 may use a filter fault object 147 (shown in FIG. 1B) to analyze notifications to determine whether they meet a predetermined threshold, indicating that an alarm corresponds to a fault in one or more managed object. Fault test component 143 may also be used to isolate the condition causing an alarm or fault. Fault repair component 144 may contain the repair policy and, in certain embodiments, repair mechanisms for specific faults. Fault repair component 144 may verify repairs using fault test component 143. Alarm logging component 145 may provide a record of platform behavior.

Figure 4B:
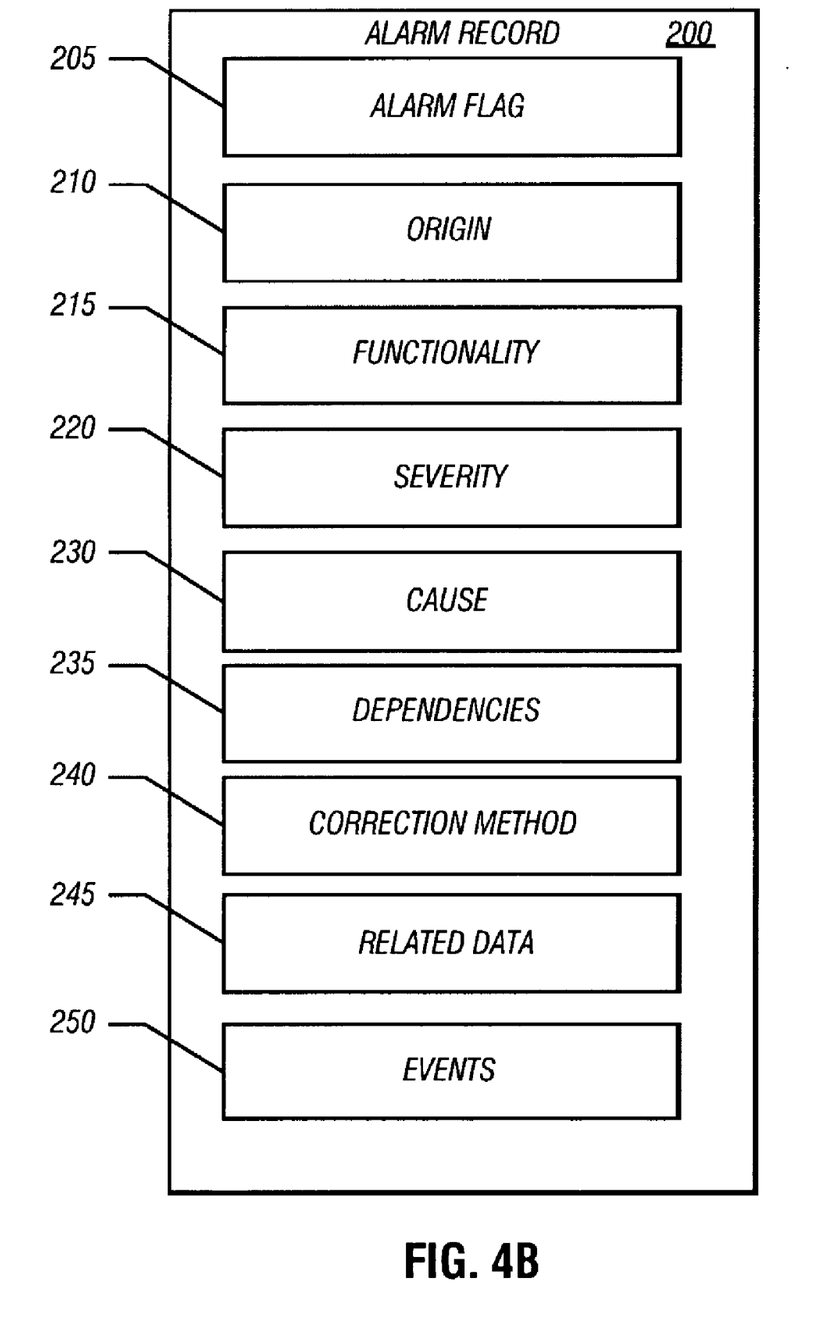
FIG. 4B is a block diagram of an alarm record in accordance with one embodiment of the present invention.

Referring now to FIG. 4B, shown is a block diagram of an alarm record in accordance with one embodiment of the present invention. For each alarm notification within system 100, an alarm record may be produced. Alarm record 200 may include attributes for determining the root origin (attribute 210), area of functionality affected (attribute 215), probable cause (attribute 230), dependencies (attribute 235) and correction method (attribute 240). Other attributes included in alarm record 200 of FIG. 4B include an alarm flag (attribute 205), severity (attribute 220), related data (attribute 245), and events (attribute 250). It is to be understood that more, fewer, or different attributes may be present in other embodiments. These attributes may assist fault analysis component 142 in isolating which functionality or performance tests to request of fault test component 143. Within fault analysis component 142, the particular MO or MO's may be isolated and functionality of performance tests requested of fault test component 143 may be performed.

Figure 5:
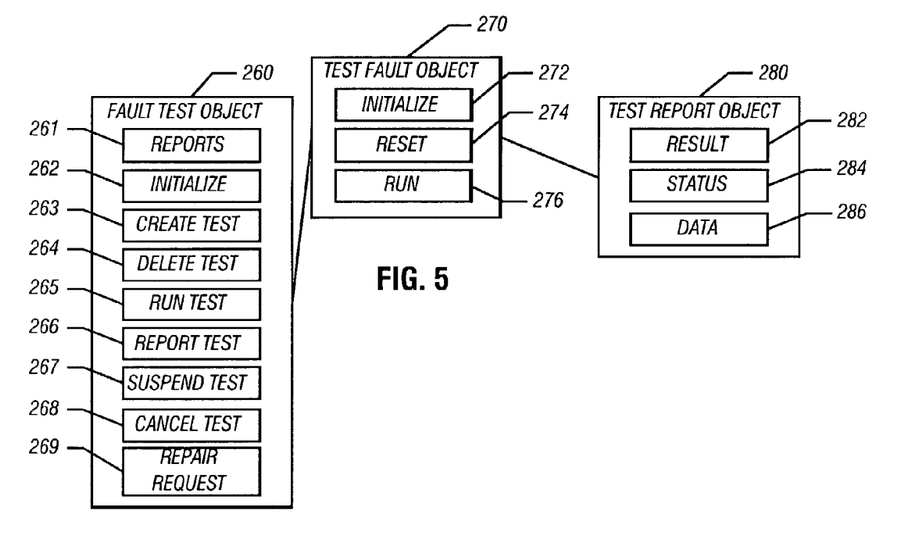
FIG. 5 is a block diagram of objects present in a fault test component in accordance with one embodiment of the present invention.

Referring now to FIG. 5, shown is a block diagram of objects present in fault test component 143 in accordance with one embodiment of the present invention. As shown in FIG. 5, fault test component 143 may include a fault test object 260, a test fault object 270, and a test report object 280. Fault test object 260 may be a high level manager of testing and an entry point to run fault tests, which may be done with a great deal of flexibility (run, initialize, reset, and the like). Test fault object 270 may perform actual running of tests, while test report object 280 may report on the results of tests.

As shown in FIG. 5, fault test object 260 may include a reports attribute 261 and a number of methods, including an initialize, create test, delete test, run test, report test, suspend test, cancel test, and repair request methods (respectively, methods 262-269). Further, test fault object 270 may include an initialize method 272, a reset method 274, and run method 276. Test report object 280 may include a result attribute 282, a status attribute 284, and a data attribute 286.

Figure 6:
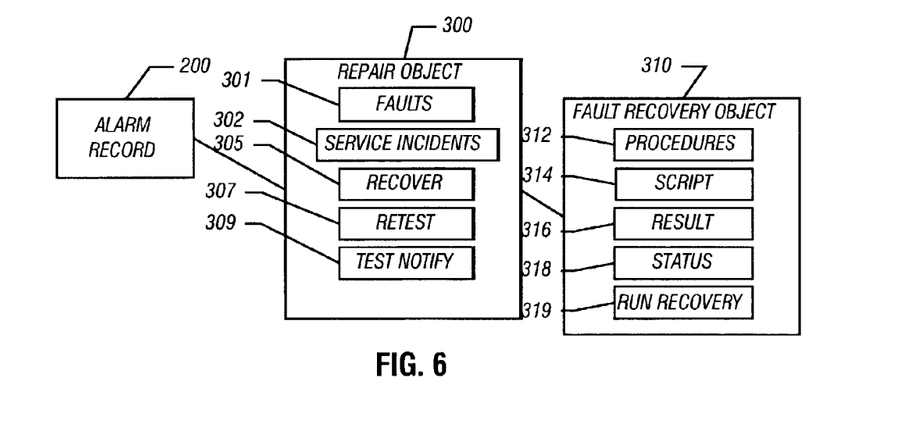
FIG. 6 is a block diagram of objects present in a fault repair component in accordance with one embodiment of the present invention.

Referring now to FIG. 6, shown is a block diagram of objects present in fault repair component 144 in accordance with one embodiment of the present invention. As shown in FIG. 6, fault repair component 144 may include a repair object 300, an alarm record 200, and a fault recovery object

310. In one embodiment, fault recovery object 310 may run repair scripts or runtimes to effect full or partial fault recovery of the detected fault, while repair object 300 may be a higher level entry point to fault recovery object 310. Repair object 300 may include a faults attribute 301 and service incidents attribute 302 and a recover method 305, a retest method 307, and a test notify method 309. Test notify method 309 may be a callback method for the test code to send notification directly back to repair object 300. Fault recovery object 310 may include a procedures attribute 312, a script attribute 314, a result attribute 316, a status attribute 318, and a run recovery method 319.

In one embodiment of the present invention, fault manager 140 may be used to analyze, isolate and repair faults occurring in fault manager 140 itself. By performing fault management techniques in a self-directed manner, self-healing of fault manager 140 may be accomplished. Prior to the detection and repair of self-faults in the fault manager 140, various activities may be performed. For example, the original code base for the fault manager 140 may be checked for integrity at system boot time to ensure that a fault arising post-boot is not intrinsic to validated code. While the manner of this check may vary, in one embodiment, checksums may be performed.

Further, prior to detection and repair, a reduced version of fault management ("FM") code may be installed and integrity checked. In effect, this code may be meta-recovery code for the repair of FM components only. In one embodiment, this reduced code may be a related collection of modules representing minimal FM functionality.

In certain embodiments, the full version of FM code base may be associated with class objects and instantiations of objects. Certain objects within this FM collection, specifically fault recovery object 310 and filter fault object 147, may normally be associated with the MO's, as shown in FIG. 1B. In addition to these FM objects, an event object 113 (also shown in FIG. 1B) may also be associated with MO's to generate MO operational, administrative, and other state changes, which may be alarms. In order for self-healing to be applied to fault manager 140, these associated objects may also be associated with the objects that make up the fault manager 140 itself (with the exception of associating an object to itself).

Figure 7:
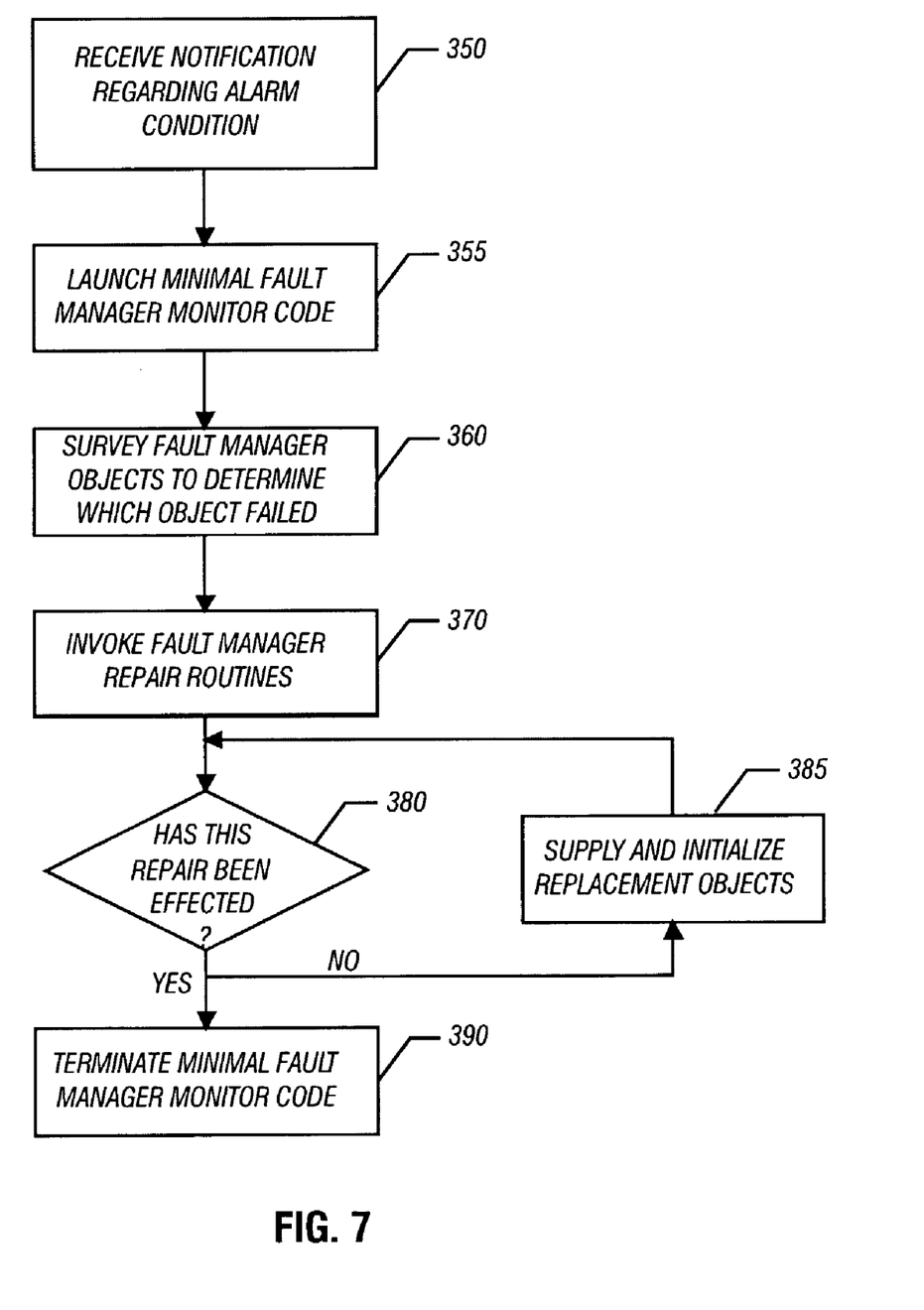
FIG. 7 is a flow chart of an example program flow for repair of a fault manager component in accordance with one embodiment of the present invention.

Referring now to FIG. 7, shown is a flow chart for self-repair of fault manager 140 in accordance with one embodiment of the present invention. When alarm detection component 141 receives a notification (block 350) which can be identified as originating with fault manager 140 itself (e.g., via origin 210, functionality 215, cause 230, or correction method 240 of alarm record 200), it will take an exception path, launching "shadow" or minimal FM monitor code (block 355).

In this minimal code, fault analysis component 142 may be employed to survey the set of known original FM objects in the system, invoking test procedures (via fault test component 143) in fault recovery object 310 pre-specified for each FM object just as for non-system managed objects. The results may be used to isolate or verify the cause to the particular FM object failure (block 360). Fault repair component 144 may then be utilized to invoke repair object 300 routines (block 370) and to verify via fault test component 143 that the repair has been effected (diamond 380). Should verification fail, the shadow FM code may supply replacement objects and re-initialize them, and again run verification to determine proper operation (block 385). Once the shadow FM monitor process has successfully repaired the original FM object(s) it may terminate (block 390).

In certain embodiments, if FM repair was not totally successful, the shadow monitor may cause the platform to be gracefully degraded. In one embodiment, the shadow monitor may provide one or more exceptions to the system 100 to initiate a graceful degradation of the platform. In one embodiment, such graceful degradation may be to reduce functionality of a portion of the platform related to the unrepaired fault. In other embodiments, the platform may be shutdown.

In the case of successful or unsuccessful recovery from a fault, repair policy within fault repair component 144 may provide for autonomous or on-demand generation of service incident (SI) records (otherwise known as "trouble tickets"). Specific SI object attribute values (such as severity, priority, work flow status, entitlement, transaction, and response time) may be set to default values appropriate for a SI transaction starting state. Information regarding the actual fault may be derived from the managed object(s) at which the fault originated.

The extent to which the quality of the descriptive information contained within a SI object collection varies may depend on the amount of trouble ticket "instrumentation" built into the managed object when created by configuration manager 110. If such instrumentation is not built-in, the object(s) may be instrumented via associated fault manager objects, such as the related data attribute 245 in alarm record 200. The format of MO trouble ticket instrumentation and a SI object collection may be implementation-dependent. In one embodiment, they may be represented as Common Information Model (CIM) object collections, since this format is widespread and convertible to well-known transmission formats such as Extensible Markup Language (XML).

Transmission of any SI collection may be based on occasional connectedness of the device and thus, SI collections may be stored at least temporarily on the platform in original format. For example, the SI collections may be stored in a circular buffer within the platform. In one embodiment, SI collections may be ordered by timestamps.

As discussed above, in one embodiment fault manager 140 includes an alarm logging component 145. Alarm logging component 145 may be used to provide a record of platform behavior, and may provide for the retention and sorting of alarm and fault records. These records may be used by various entities for different purposes, such as diagnostics (automatic or human initiated), problem resolution managers, maintenance managers and others.

In one embodiment, a simplified subscription model may be used for the setting of alarms and faults via alarm logging component 145. Entities which are interested consumers of fault and alarm logs may "subscribe" to a log and configure the parameters of a filter as to how logs are generated and presented.

Figure 8:
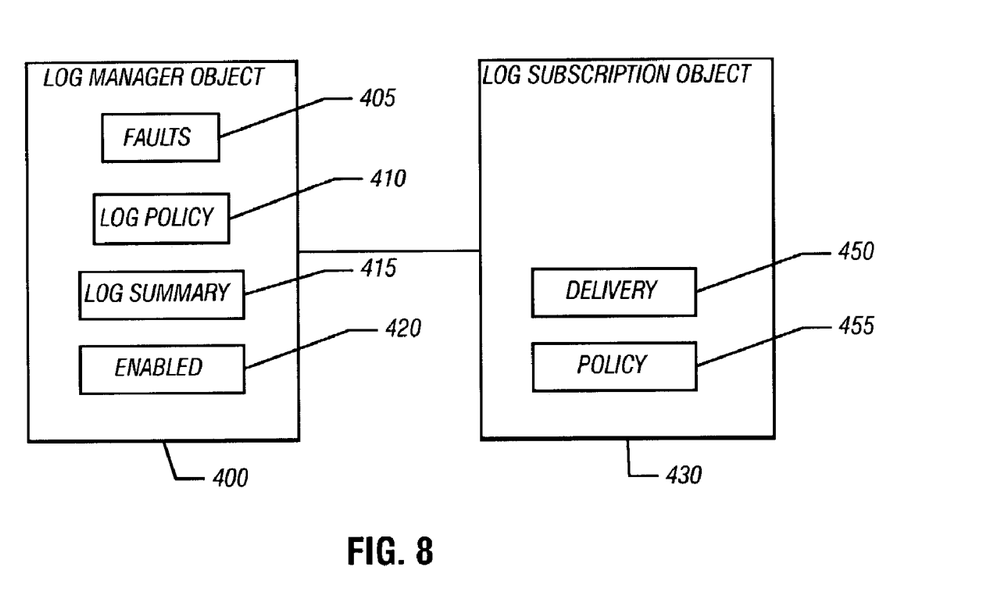
FIG. 8 is a block diagram of a log manager object and a log subscription object in accordance with one embodiment of the present invention.

Referring now to FIG. 8, shown is a block diagram of a log manager object and a log subscription object in accordance with one embodiment of the present invention. Log manager object 400 may be used to maintain a list of alarm and fault records globally, and may allow for global policy adjustments relating to logging, such as overall retention/ storage policy (e.g., based on time or space constraints). In one embodiment, log subscription object 430 may provide an interface to alarm consumers (e.g., fault analysis component 142).

As shown in FIG. 8, log manager object 400 may include a faults attribute 405, which may be used to handle current faults kept by fault manager 140. Additionally a log policy attribute 410 may be used to provide a global policy on storage and time limits, and in certain embodiments may include filtering based on fault severity. Log summary attribute 415 may provide a brief summary of log contents, and enabled attribute 420 may be used to turn alarm logging on and off.

In one embodiment, log subscription object 430 may include a delivery attribute 450 to describe the recipient of log information. If no recipient is present, the log may be retained by fault manager 140 for later retrieval. As shown in FIG. 8, log subscription object 430 may also include a policy attribute 455 which may provide local policy on what is logged and retention limits. In certain embodiments, this policy attribute 455 may be overwritten by the log policy attribute 410 of log manager object 400 in case of a conflict.

In various embodiments, logging policy may be determined both globally within log manager object 400 itself, and locally, or individually, per subscriber. Global logging policy may be more coarse than local policy, governing the ability of the platform to acquire and store alarm and fault records or general synchronization features. Local control may filter the entire set of records for a particular use.

In one embodiment, four levels or types of log subscription filtering may exist. First, an enablement level may exist, in which global alarm logging within system 100 can be turned on or off completely. Second, a global constraint level, in which logging can be adjusted to account for platform or subscriber constraints for the alarm logging component, may exist. Parameters for these constraints may include size (storage space for logs if they are retained), time (retention of logs according to timestamp decay), and severity (derived from fault manager 140—critical, major, minor, unknown). Third, a local constraint level may exist in which individual subscribers can utilize the same parameters as used for global constraint to adjust their constraints. In one embodiment, where there is a conflict between global and local constraints (e.g., local policy wants to keep alarms five days, but global policy only allows retention up to one day), global constraints may override local ones. Finally, a presentation level may exist in which the subscriber may specify the descriptive quality of logs as full or summary. Other policies may exist in other embodiments.

Embodiments of the present invention may be implemented in code and may be stored on a storage medium having stored thereon instructions which can be used to program a system, such as a wireless device or network to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), flash memories, electrically erasable programmable read-only memories (EEPROMs), magnetic or optical cards, or any type of media suitable for storing electronic instructions. Similarly, embodiments may be implemented as software modules executed by a programmable control device, application specific integrated circuits (ASICs), and the like.

Figure 9:
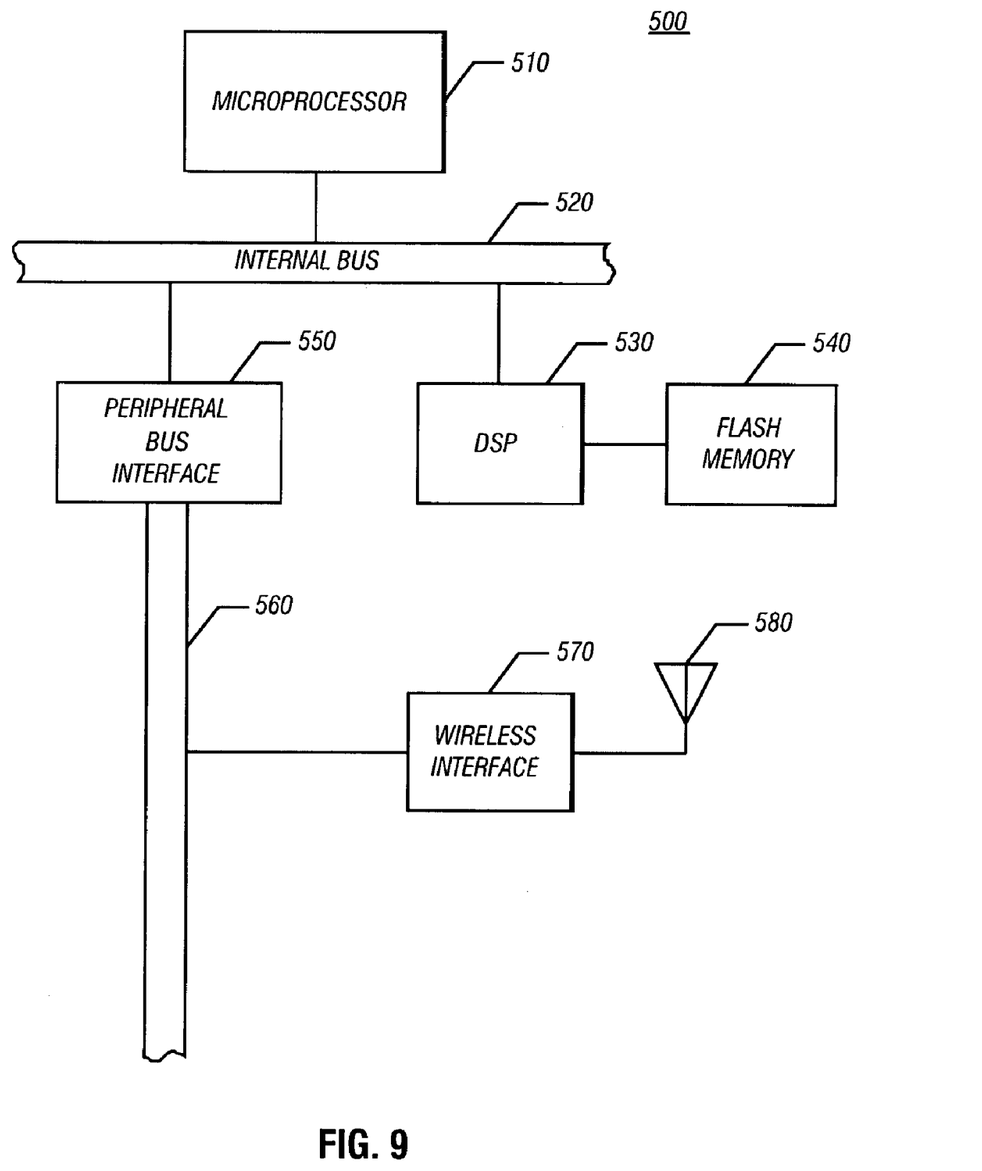
FIG. 9 is a block diagram of a wireless device for use in accordance with one embodiment of the present invention

FIG. 9 is a block diagram of a wireless device with which embodiments of the invention may be used. As shown in FIG. 9, in one embodiment wireless device 500 includes a processor 510, which may include a general-purpose or special-purpose processor such as a microprocessor, microcontroller, ASIC, a programmable gate array (PGA), and the like. Processor 510 may be coupled to a digital signal processor (DSP) 530 via an internal bus 520. In turn, DSP 530 may be coupled to a flash memory 540.

As shown in FIG. 9, microprocessor device 510 may also be coupled to a peripheral bus interface 550 and a peripheral bus 560. While many devices may be coupled to peripheral bus 560, shown in FIG. 9 is a wireless interface 570 which is in turn coupled to an antenna 580. In various embodiments antenna 580 may be a dipole antenna, helical antenna, global system for mobile communication (GSM) or another such antenna.

Although the description makes reference to specific components of device 500, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a configuration manager on a wireless network device, which is connectable to a remote base station, to define and maintain configuration data regarding a resource of the wireless network device via a plurality of managed objects that represent the resource; and
    a fault manager located on the wireless network device comprising a main fault manager for managing faults of the managed objects and a shadow fault manager for managing faults of the main fault manager, the shadow fault manager to isolate a fault of the main fault manager to a faulty object, to supply and initialize a replacement object for the faulty object, and to reduce functionality of a platform associated with the faulty object.

2. The system of claim 1, further comprising a performance manager of the wireless network device to measure performance of the resource of the wireless network device via the plurality of managed objects.

3. The system of claim 1, further comprising an accounting manager in the wireless network device to maintain accounting information related to the wireless network device; wherein the accounting information includes a software attribute and a software method associated with each of the following: service subscription information and account balance information that is viewable on the wireless network device.

4. The system of claim 1, further comprising a database within the wireless network device to store the configuration data.

5. The system of claim 1, further comprising an alarm log manager to filter a plurality of alarms based on a predetermined constraint.

6. The system of claim 5, wherein the predetermined constraint includes fault severity.

7. The system of claim 5, further comprising a circular buffer for storing an alarm log.

8. A method comprising:
    repairing a fault in response to an alarm condition detected by a main fault manager for managing faults of a plurality of managed objects of a wireless network device, wherein the main fault manager is located exclusively in the wireless network device, wherein the wireless network device is connectable to a remote base station, wherein the alarm condition originates in the main fault manager, the repairing using a shadow fault manager located exclusively in the wireless network device that isolates the fault of the main fault manager to a faulty object, replaces the faulty object with a replacement object, and reduces functionality of a platform associated with the faulty object if the replacement object does not resolve the alarm condition.

9. The method of claim 8, further comprising verifying that the fault has been repaired.

10. The method of claim 8, further comprising generating a service incident record corresponding to the fault.

11. The method of claim 10, further comprising temporarily storing the service incident record on the wireless network device when not connected to the remote base station.

12. The method of claim 10, further comprising transmitting the service incident record to the remote base station.

13. The method of claim 8, further comprising filtering a plurality of alarms based on fault severity and the size of a memory for storing the filtered alarms.

* * * * *